(12) United States Patent
Leisure et al.

(10) Patent No.: US 7,584,107 B2
(45) Date of Patent: Sep. 1, 2009

(54) DEFINED CONTRIBUTION BENEFITS TOOL

(75) Inventors: Lawrence B. Leisure, Atherton, CA (US); Jeffrey L. Huxley, Little Canada, MN (US); Renee J. Brown, Chicago, IL (US); Heather M. Abodeely, Chicago, IL (US); David R. Dahle, Wynnewood, PA (US); Cecil R. Dearborne, Chicago, IL (US); Amy Farkas, New York, NY (US); Evelyn G. Goodfriend, San Francisco, CA (US); Laurie H. Maiser, Plymouth, MN (US); Amie A. Ludwig, Minneapolis, MN (US); David Rey, Lafayette, CA (US); Melinda W. Steinmetz, San Francisco, CA (US); Glenn A. Stolar, Chanhassen, MN (US); Erik C. Swanson, New York, NY (US); Joseph E. Villa, San Francisco, CA (US)

(73) Assignee: Accenture Global Services GmbH (CH)

( * ) Notice: Subject to any disclaimer, the term of this patent is extended or adjusted under 35 U.S.C. 154(b) by 1293 days.

(21) Appl. No.: 10/237,889

(22) Filed: Sep. 9, 2002

(65) Prior Publication Data
US 2004/0049397 A1 Mar. 11, 2004

(51) Int. Cl.
*G06Q 99/00* (2006.01)
(52) U.S. Cl. .................................................. 705/1
(58) Field of Classification Search .................. 705/1
See application file for complete search history.

(56) References Cited

U.S. PATENT DOCUMENTS

2002/0049617 A1* 4/2002 Lencki et al. .................. 705/4
2002/0059587 A1* 5/2002 Cofano et al. ................ 725/35
2002/0077873 A1* 6/2002 Clarke ............................ 705/7
2002/0149616 A1* 10/2002 Gross et al. ................ 345/745
2003/0105692 A1* 6/2003 Gilbert et al. ................ 705/35
2003/0229522 A1* 12/2003 Thompson et al. ............. 705/4

OTHER PUBLICATIONS

Gale et al., Understanding the Shift From Defined Benefit to Defined Contribution Plans, proceedings of ERISA After 25 Years: A Framework for Evaluating Pension Reform, convened by Brookings, the Stanford Institute for Economic Policy Research, and the TIAA-CREF Institute, National Press Club, Date Sep. 1999.

* cited by examiner

*Primary Examiner*—Jonathan Ouellette
(74) *Attorney, Agent, or Firm*—Finnegan, Henderson, Farabow, Garrett & Dunner, L.L.P.

(57) ABSTRACT

A defined contribution benefits tool having various embodiments interfaces employers, employees, brokers and benefits suppliers. Suppliers provide product information. An employer creates an employer profile indicating the categories of benefits to offer, which categories are required, which categories the employer will contribute to, and the contribution range for the categories. Based on the profile (and from other available products), a portfolio recommendation that essentially meets the requirements is generated. Based on the portfolio recommendation, the employer chooses a set of products as its benefits portfolio. Employees create an employee profile allocating the total employer contribution among a set of benefit categories. A package recommendation that essentially meets the requirements set forth in the employee's profile is generated. From this recommendation (and from other available products), the employee chooses his or her benefits package.

60 Claims, 17 Drawing Sheets

Welcome to the Benefits Tool

We help make defined contribution simple for you!

For Employees

Defined contribution is a term that describes the concept of employers contributing a specified amount toward employee benefits and employees choosing which benefits to buy. We believe that we are at a threshold where defined contribution will make the next leap. Employers will designate a specific amount of money and allow employees to optimize how their compensation dollars are spent based on unique individual needs with the guidance and security employees expect from their employers.

For Employers

Defined contribution is the logical step in the evolution of benefits as a component of compensation where full information and choice will provide increased value for you, the employee, and you, the employer.

For Suppliers

Allow the Benefits Tool to guide you through and make defined contribution work for you.

For Brokers

FIG. 7

| Benefits Tool | Home | Glossary | FAQ's | Contact Us | Site Map |

Your Account

*Dynamic Graphics,*
Your employee portfolio for 2000 offers your employees..  915

Health Insurance

| Supplier | Product | Annual Employer Cost | | | | Annual Employee Cost | | | |
|---|---|---|---|---|---|---|---|---|---|
| | | Single Min | Single Max | Family Min | Family Max | Single Min | Single Max | Family Min | Family Max |
| AllMyCare | HMOa10 | $2400 | $2800 | $4000 | $5000 | $440 | $580 | $1285 | $1708 |
| GoodRemedy | TradPref | $2325 | $2750 | $3750 | $4800 | $400 | $600 | $1175 | $1500 |
| GoodRemedy | PPO15c | $2400 | $2800 | $3700 | $4750 | $415 | $630 | $1200 | $1650 |
| AllMyCare | PPOb30 | $2150 | $3000 | $4500 | $5500 | $390 | $550 | $1300 | $1856 |

Health FSA

| Supplier | Product | Annual Employer Cost | | Annual Employee Cost | |
|---|---|---|---|---|---|
| | | Min | Max | Min | Max |
| AllMyCare | FSA | $0 | $1000 | $0 | $1000 |

Dental Insurance

| Supplier | Product | Annual Employer Cost | | | | Annual Employee Cost | | | |
|---|---|---|---|---|---|---|---|---|---|
| | | Single Min | Single Max | Family Min | Family Max | Single Min | Single Max | Family Min | Family Max |
| TopTeeth | Denta4s | $72 | $144 | $144 | $288 | $0 | $72 | $0 | $144 |

Retirement

| Supplier | Product | Annual Administration Fee | Annual Maximum Contribution % |
|---|---|---|---|
| MoneyWatch | 401(k) | $2900 | 6% of salary or $0 maximum |

Life

| Supplier | Product | Annual Employer Cost | | Annual Employee Cost | |
|---|---|---|---|---|---|
| | | Min | Max | Min | Max |
| LiveLong | 2xSalary | $.74 | $.88 | $.37 | $.42 |

Costs for Life are based upon a per $1000 of coverage amount..

Auto Insurance

| Supplier | Product | Annual Employer Cost | | Annual Employee Cost | |
|---|---|---|---|---|---|
| | | Min | Max | Min | Max |
| DontDent | FullColide | $0 | $0 | $1800 | $1800 |

Concierge

| Supplier | Product | Annual Employer Cost | | Annual Employee Cost | |
|---|---|---|---|---|---|
| | | Min | Max | Min | Max |
| AtYourService | DineOut | $0 | $60 | $0 | $60 |
| AtYourService | DVDFan | $0 | $480 | $0 | $480 |
| AtYourService | PROTICK | $0 | $240 | $0 | $240 |

Reports
Review Employees
Summary

Your Profile
Edit/View Profile

Your Portfolio
Create New
Modify Current
Edit Scenario

View Products  905

DEFINED CONTRIBUTION BENEFITS TOOL

BACKGROUND OF THE INVENTION

In 1847, the Massachusetts Health Insurance Company of Boston became the first insurer to offer sickness insurance. In 1877, the Granite Cutters Union established the first national sick benefit program. More than 30 years later, Montgomery Ward & Co.—the historic catalog and retail giant—entered into one of the earliest group insurance contracts. Since these early days of health insurance, employers now offer a wide range of benefits to their employees. For example, an employee's benefits package may include health care, life insurance, short and long term disability insurance, 401 (k) or other retirement savings account, dental and vision coverage and parking or mass transit discounts.

Some of the elements of an employee's benefits package are required by law. Other elements are heavily regulated. Yet other elements are merely perks offered by the employer. Each year, companies roll out better benefits packages to attract and retain employees. Such packages result in an employee's actual compensation being much more than the employee's base salary. In fact, it is not uncommon for an employee's benefits to be worth 15% of his or her base pay.

In recent years, employers have been working to offer their employees a new type of benefits portfolio—referred to as "defined contribution benefits." With respect to the health care portion of a benefits package, there are at least three trends that have prompted employers to investigate such defined contribution benefits: (1) health care inflation has been in the double-digits; (2) both employees and their physicians are unsatisfied with current managed care models; and (3) the Internet, with its incredible offering of information, has created a rise in "health care consumerism" in which employees treat health care like more traditional services and require the balance between the quality of the service and the price for such service.

Employers are investigating whether new approaches involving defined contribution benefits might not only hold down health care costs, but at the same time increase employee choice and satisfaction concerning their health care. Wanting to increase employee satisfaction (and thus hope to retain the best employees) is also a driving force for developing improved defined contribution plans for other benefits outside of the health care arena.

In today's general employment setting, employees express concerns over the selection of benefits. These employees believe the plans are chosen for the good of the group, not for the needs of the individual employee. For example, an employer may only offer an expensive indemnity health plan that is rich in benefits, a voluntary long term disability policy, a non-matching 401(k), and a $100,000 life and accidental death insurance policy. Such a cookie-cutter plan obviously will not meet the particular needs of each employee.

It is not only the employees that are dissatisfied with the current method of offering benefits portfolios. Employers must utilize several benefit providers and are displeased with the administration costs required to maintain their setups. Human resource departments need dedicated staff to manage the plans. These staff members spend valuable time controlling the enrollment paperwork, multiple billing invoices, consolidation of multiple provider reports, and meeting with unsatisfied employees. All are disheartening characteristics of today's benefits process.

What is needed is an improved way to offer benefits. This improvement should make tasks performed by all parties easier. Employers should be able to offer a greater number of choices without adding undue management requirements. The benefits themselves should be highly customizable so that each employee can generate a package well suited to his or her personal circumstances. Such an improved benefits system should be scalable and available to both small companies as well as to giant corporations.

SUMMARY OF THE INVENTION

In a broad sense, a defined contribution benefits tool interfaces employers, employees, and benefits suppliers. Suppliers provides product information about plan variations of their products and this information is stored on a computer network. In one embodiment, an employer creates an employer profile indicating the categories of benefits to offer, which categories are required, which categories the employer will contribute to, and the contribution range for the categories. The contribution range is the minimum, the maximum, and/or the value cap that can be allocated to a category. This range is imposed upon the employees by the employer to safeguard against the employees misallocating their fund accounts, which might result in an employee having a major health problem but not having any health insurance. Based on the profile, a recommended combination of product plans that essentially meets the requirements set forth in the employer profile is generated. Based on the recommendation, the employer then chooses a set of product plans as its benefits portfolio.

In one embodiment, employees design customized benefits packages by creating an employee profile allocating the total employer contribution among a set of benefit categories (within the contribution ranges set forth by the employee's employer). A recommended combination of product plans that essentially meets the requirements set forth in the employee's profile can then be generated. From this recommendation (and from other available products), the employee may choose a set of product plans as his or her benefits package.

The present invention offers many advantages over the prior art. In one embodiment, the present invention can allow the employee and employer access to a website for each supplier so that the employer or employee can perform product research. Administration costs can be reduced by the automation of the present invention. Employees can be empowered by the multitude of choices and by the self-service feature of the system. In some embodiments, the present invention can interface with payroll or other systems for additional functionality, such as data analysis on a multi-tiered level. The design of the user interface of the present invention can assist in simplifying the use of the system. In some embodiments, simple questions can be presented to the supplier, employer, or employee to gather information (on employer budgets and projections, for example). The system can offer real time quotes to employers and employees. Shopping for and enrolling in a plan can become a paperless experience. As the invention solicits the needs of the employees, the system can be proactively improved to ensure employee satisfaction.

BRIEF DESCRIPTION OF THE DRAWINGS

FIGS. 7 through 17 show some of the primary web pages for one preferred embodiment of the defined contribution benefits tool system.

DETAILED DESCRIPTION OF THE INVENTION

Figure 1:
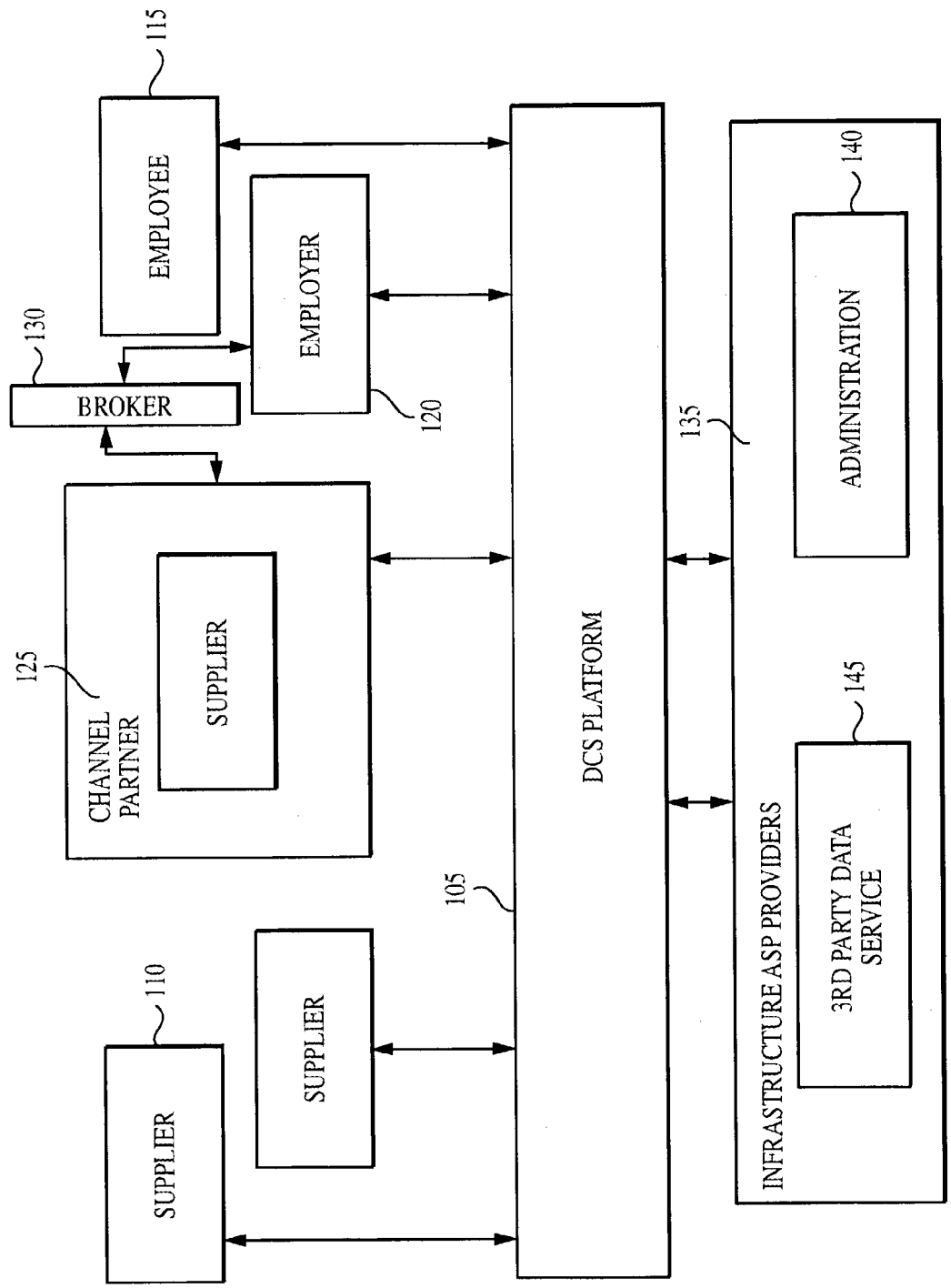
FIG. 1 is a block diagram of one embodiment of the defined contribution benefits tool.

A. General Overview of Preferred Terminology and the Benefits Tool

While many terms can be used to refer to the same concept, the following terms are preferably used herein to describe the present invention.

| Preferred Term | Description of Term |
| --- | --- |
| Benefits portfolio | From a large number of product plans offered by various suppliers, an employer chooses a set of products to offer as options to its employees. This customized set of product plans is the employer's benefits portfolio. |
| Defined Contribution Benefits portfolio | If the employer allows each of its employees to allocate a certain amount of funding among the various product plans, then the employer is offering a defined contribution benefits portfolio. |
| Benefits package | The employee reviews the products listed in the employer's benefits portfolio. From these, the employee chooses his or her own personalized benefits package. |
| Benefit Categories | The product plans in an employer's benefits portfolio (or in an employee's benefits package) are arranged into a set of benefit categories. Such benefit categories may include: health insurance, life insurance, disability insurance, and retirement savings accounts. |
| Employer Profile | To use the present invention, an employer sets up an employer profile that indicates the categories of benefits to offer, which categories are required, which categories the employer will contribute to, and the contribution range for the categories. |
| Portfolio Recommendation | The portfolio recommendation is a combination of product plans that essentially meets the requirements set forth in the employer profile. The employer's benefits portfolio may be created to exactly match this portfolio recommendation. The employer may also decide to include only some (or even none) of the recommended product plans in its benefits portfolio. |
| Package Recommendation | An employer informs the employee how much the employer will contribute for funding his or her benefits. The employee then indicates how this funding should be allocated across the various benefit categories. The package recommendation is a combination of products (chosen from the employer's benefits portfolio) that essentially meets this allocation. |

Although the above terms are preferred, alternate terms are also used herein. For example, sometimes the term product is used to refer to a product plan.

In its broadest sense, the present invention is a computerized defined contribution tool referred to as "the benefits tool" or "benefits system." The benefits tool can improve the present day system of benefit management. As a first example of its use, consider a married father of three, who struggles with caring for his ailing parent as well as planning for his retirement. His employer has tailored its compensation package to meet the needs of its young, single workforce. He is an exception. He finds himself with no retirement plan, a health plan that is extremely expensive for dependents, and many unneeded perks—such as a social event every month. The father has important issues to consider, such as: aging, stopping smoking, high blood pressure, braces, helping his children through college, etc. The father does not receive assistance from his employer nor his health care company to determine how best he can afford to meet these goals.

With the benefits tool, that same father can design his own compensation benefits package. He may begin by accessing the benefits tool's web site and answering the questions presented. The benefits tool may then relatively quickly provide him with an advised portfolio. It includes recommendations for a PPO health plan with a low deductible and rich benefits for dependents, a flexible spending account that would cover braces and a smoking cessation program, a long term care policy for his parent, long term disability, life insurance, a 401(k) contribution amount, and homeowner's insurance. He can study the advice and tailor his package accordingly. He can decide to change the percentage of funds in the flexible spending account, because his wife's company will be covering braces. In addition, he can choose to include car insurance. Once satisfied, the father can confirm the package and place his order. The benefits tool system may then ask whether he would like to be contacted by the Employee Assistance Program service, which may be able to offer guidance, give support, and provide suggestions for dealing with an elderly dependent.

As a second example on the inadequacy of today's benefits, consider a twenty-five year old single female who is in the middle of completing her open enrollment forms. From them, she learns that her employer is once again providing only a very comprehensive medical plan and limited retirement funds. Her goals conflict with the compensation package being offered, especially since she rarely visits the doctor. She would rather spend her money on items she deems as important: eyeglasses, the dentist, a health club membership, season tickets to her favorite football team, etc. She questions why she should contribute money that seems to be just "thrown away."

However, through the help of the benefits tool, she can log into the web site and respond to a few simple questions regarding a broad spectrum of lifestyle issues. She may then invoke the configuration module, and within seconds may be advised that her best compensation options include catastrophic health coverage with a high deductible, a well-funded flexible spending account, and an investment goal to maximize her 401(k) opportunities. As an aside, the benefits tool system can also offer her non-routine fringe benefit options, such as season tickets to a city's pro football games. Through such a benefits tool, employees such as this one can better meet their needs. She may choose to complete a survey form that expresses her feelings about the compensation strategy her employer has adopted.

Turning now to the workings of the benefits tool, FIG. 1 is a block diagram of one embodiment of the present invention. In it, a platform 105 interconnects and integrates the various components and parties, including suppliers 110, employers 120, and employees 115. Connection to the benefits tool platform 105 is preferably made through the Internet using a secure connection. Alternatively, a LAN, WAN, or other network can be used. Brokers 130 participate to work between an employer 120 and suppliers 110. One or more of the suppliers 110 can be channel partners 125. Such channel partners 125 are often providers of a "primary" benefit category, such as healthcare policies or 401(k) plans. Suppliers 110 that are not channel partners 125 may offer secondary benefit categories, such as: mass transit passes, auto insurance, concierge services, dental insurance, and the like.

Figure 2:
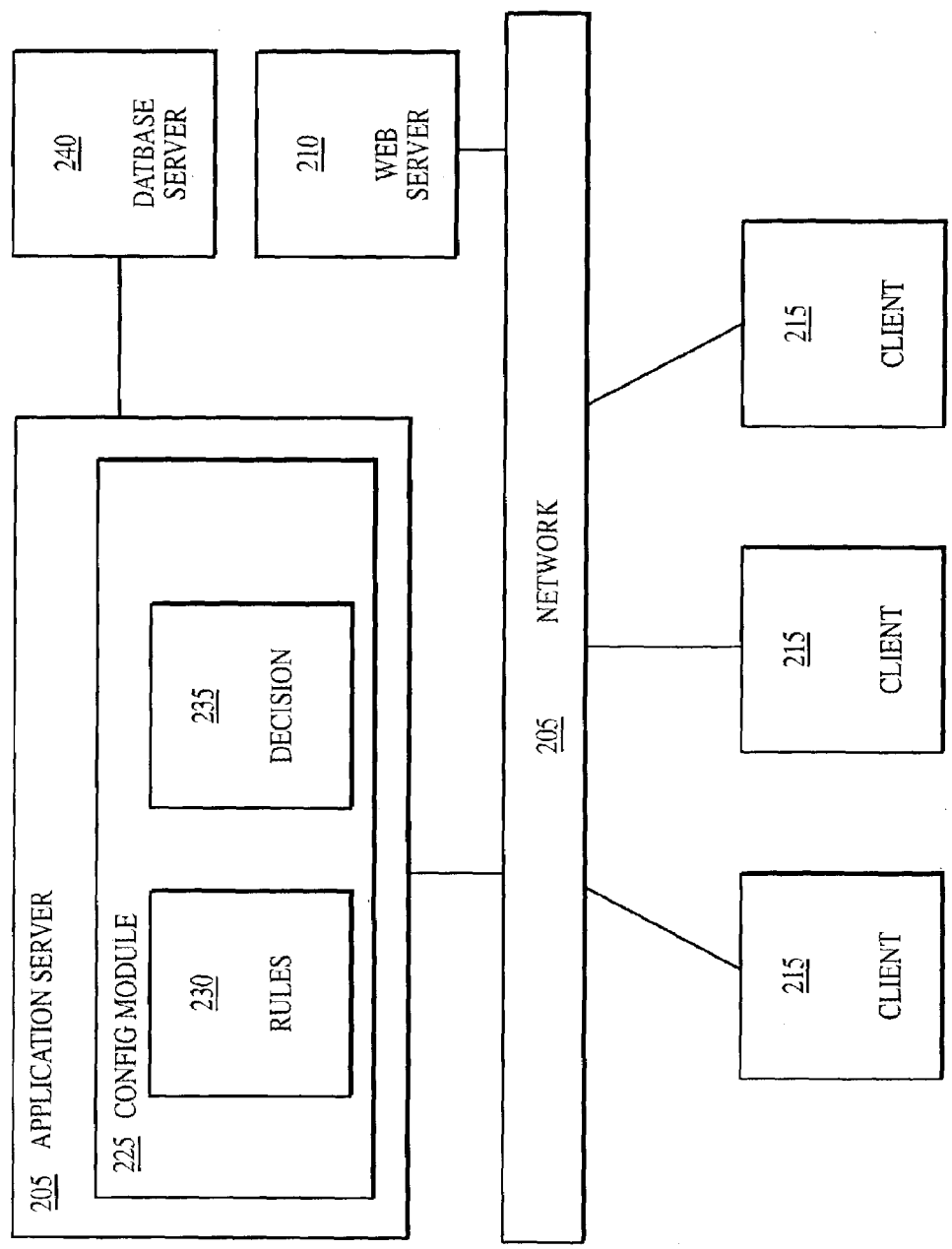
FIG. 2 is a block diagram of one embodiment of the benefits tool architecture.

FIG. 2 is a block diagram of the benefits tool architecture for one embodiment of the invention. In FIG. 2, an application server 205, a web server 210 and a series of clients having web browsers 215 may all be connected to a network 220, such as the Internet. The application server 205 may include custom and third party modules, including a configuration module 225 that includes a rules engine 230 and a decision support engine 235. The application server 205 may also be connected to a database server 240.

Each function within the benefits tool system may be enabled through various types of software modules and techniques, including among others, HTML screens, ASP screens, graphics, and/or java objects. Third party, off-the-shelf software may also be configured and used as components of the present invention. For example, to provide personalization services, the BLAZE ADVISOR software package offered by HNC Software, the CALICO ADVISOR software package offered by Calico Commerce Inc., the CRM CONFIGURATOR module offered by PeopleSoft, Inc. or a software package offered by Firepond, Inc. may be used. WEBLOGIC software offered by BEA Systems, Inc. can be used as an application service. Content management may be handled by Vignette Corporation's V6 Content suite. SeeBeyond Technology Corporations's eGate suite may be used for application integration. Oracle Corporation's solutions may be implemented as the central database. Of course, countless combinations of other technologies can be used to provide the functionality of the present invention.

B. Interacting with the Benefits Tool

Figure 3:
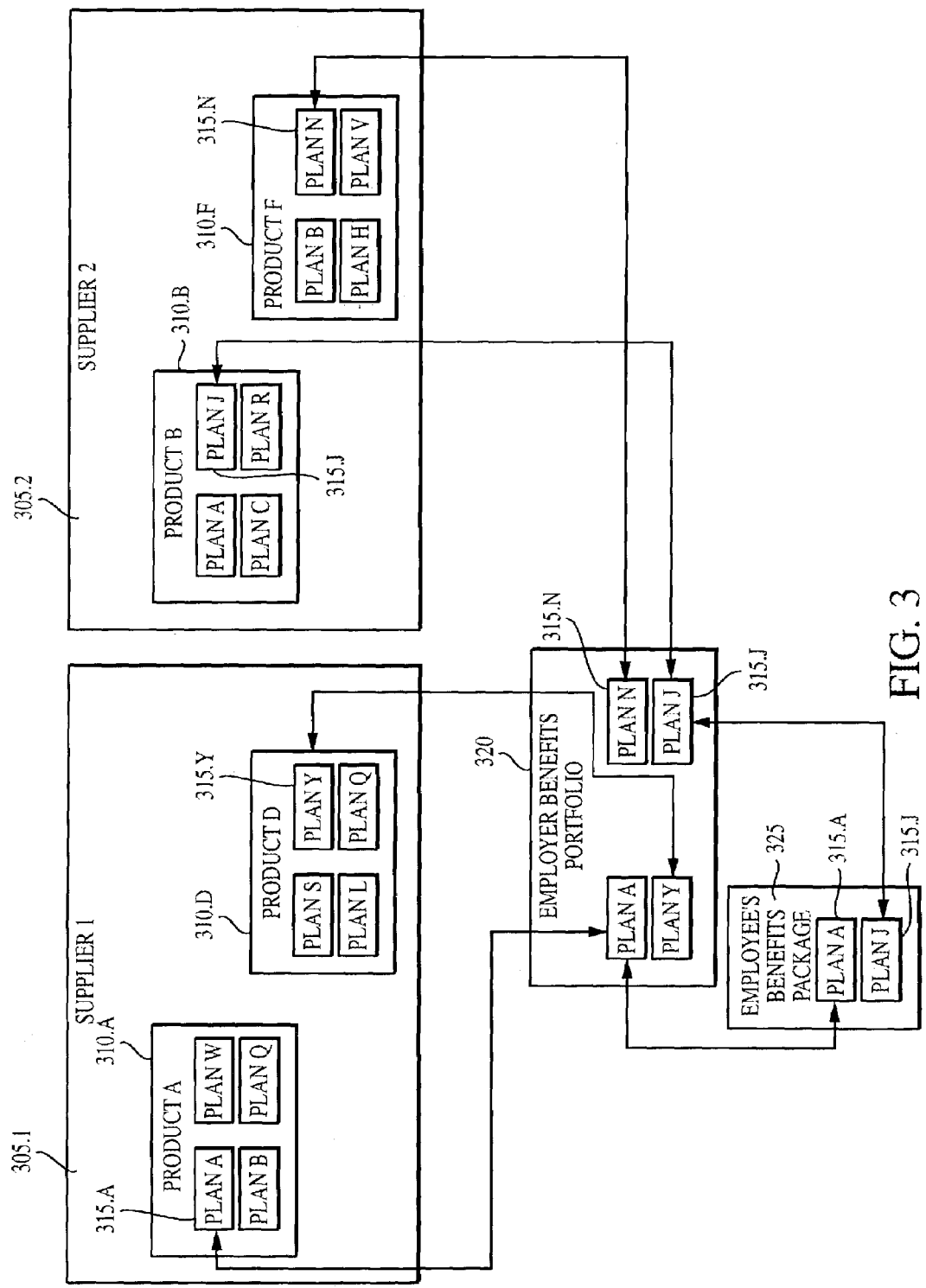
FIG. 3 illustrates the relationship among suppliers, employers and employees with respect to benefitss.

The benefits tool system can be an integral component of a new benefits management methodology for defined contribution benefits. The primary parties who use the system can be suppliers of products, brokers (for both small and large employers), employers, and employees. FIG. 3 illustrates the relationship among suppliers, employers and employees with respect to benefits. Suppliers 305.1 and 305.2 can each offer various products (310.A, 310.D, etc.). For example, Product A may be a health care insurance product while Product D is a long-term disability product. Each product may have one or more configured product plans (315.A, 315.W, 315.B, etc.) For example, the long-term disability product 310.D may be offered as Plan S which provides 50% of the employee's regular salary, Plan Y which provides 60% of the salary, and Plan Q which provides 70% of the salary.

From the various product plans for the various products that are offered by the suppliers, an employer may choose a grouping of plans to make available. This grouping is the employer's benefits portfolio 320. As part of the benefits portfolio, qualifications can be included, such as whether a product type is required, and the amount to be contributed by the employer for that product type. Once the employer has finalized its benefits portfolio 320, its employees may access the system to generate their customized benefits packages 325. Thus, the benefits package 325 for an employee is made up of product plans (315.A and 315.J) that are components of the employer's benefits portfolio 320, and that are product plans from various suppliers 305.

1. The Workflow for Suppliers

Figure 4:
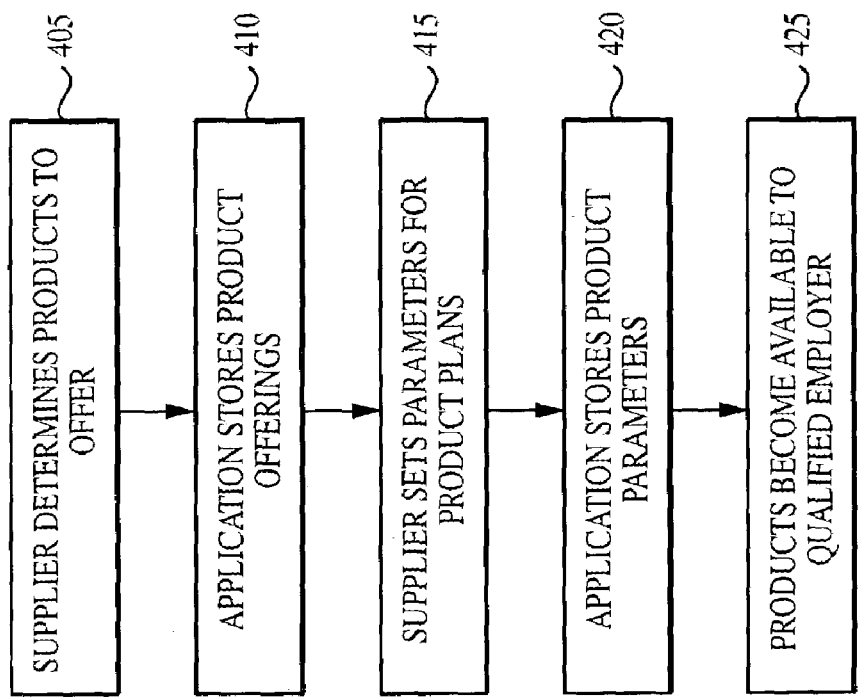
FIG. 4 is a flowchart showing how a supplier may interact with the present invention.

Suppliers are the foundation of the present invention in that they offer the product plans that are grouped into employer benefits portfolios and then chosen by an individual employee to make up a benefits package. In FIG. 4, the supplier's activities are illustrated for one embodiment of the invention. First, a supplier 305 can determine which products to offer through the benefits tool invention (step 405). Information about the products may be stored in a database by the benefits tool (step 410). In addition, various product plan parameters can be input (step 415) and stored (step 420). For example, a supplier may require that certain products or product plans be available only to employers having more than 100 employees, or only to employees residing in certain states. Once the supplier is satisfied with the information provided to the benefits tool, the product plans can be made available via the benefits tool to qualifying employers (step 425).

In some embodiments, each supplier participates more than by simply listing their products through the benefits tool. Rather, the supplier's workflow after initial listing is cyclical. A cycle begins when a new group uses the benefits tool to enroll in one of the supplier's product offerings. The supplier may then perform underwriting analysis to evaluate product performance. If performance is unacceptable, the product offering may be discontinued to new groups, or it may be removed from existing policy holders and replaced with a richer product. Based on the underwriting, product adjustments can be made, such as offering the product to new groups or to renewing groups not previously electing the product. On an annual basis (usually), the policy is renewed and the group is given the opportunity to submit changes or enroll in the product offering. This cycle of enrolling/changing, underwriting, adjusting, and renewing can be repeated by each participating supplier.

2. The Workflow for Employers

The present invention benefits tool can assist employers by reducing their administration time while increasing the number and types of benefits they can offer to their employees. Based on information about an employer (such as industry code, number of employees, etc.), the benefits tool may present a group of benefits available to the employer. From this large group, the employer can choose a set of product plans, known as the employer's benefits portfolio. As with the suppliers, employers can use the benefits tool to support their cyclical tasks. In one embodiment, a cycle begins with the initial benefit and supplier selection through the benefits tool. The employer can instruct its employees to enroll in their own personalized benefits packages. The employer may periodically assess whether the employees are satisfied with the product plan and may make minor product or price adjustments, major product adjustments, or even introduce a new supplier having new product plans. In many circumstances, such changes can only be made for the next policy year.

Figure 5:
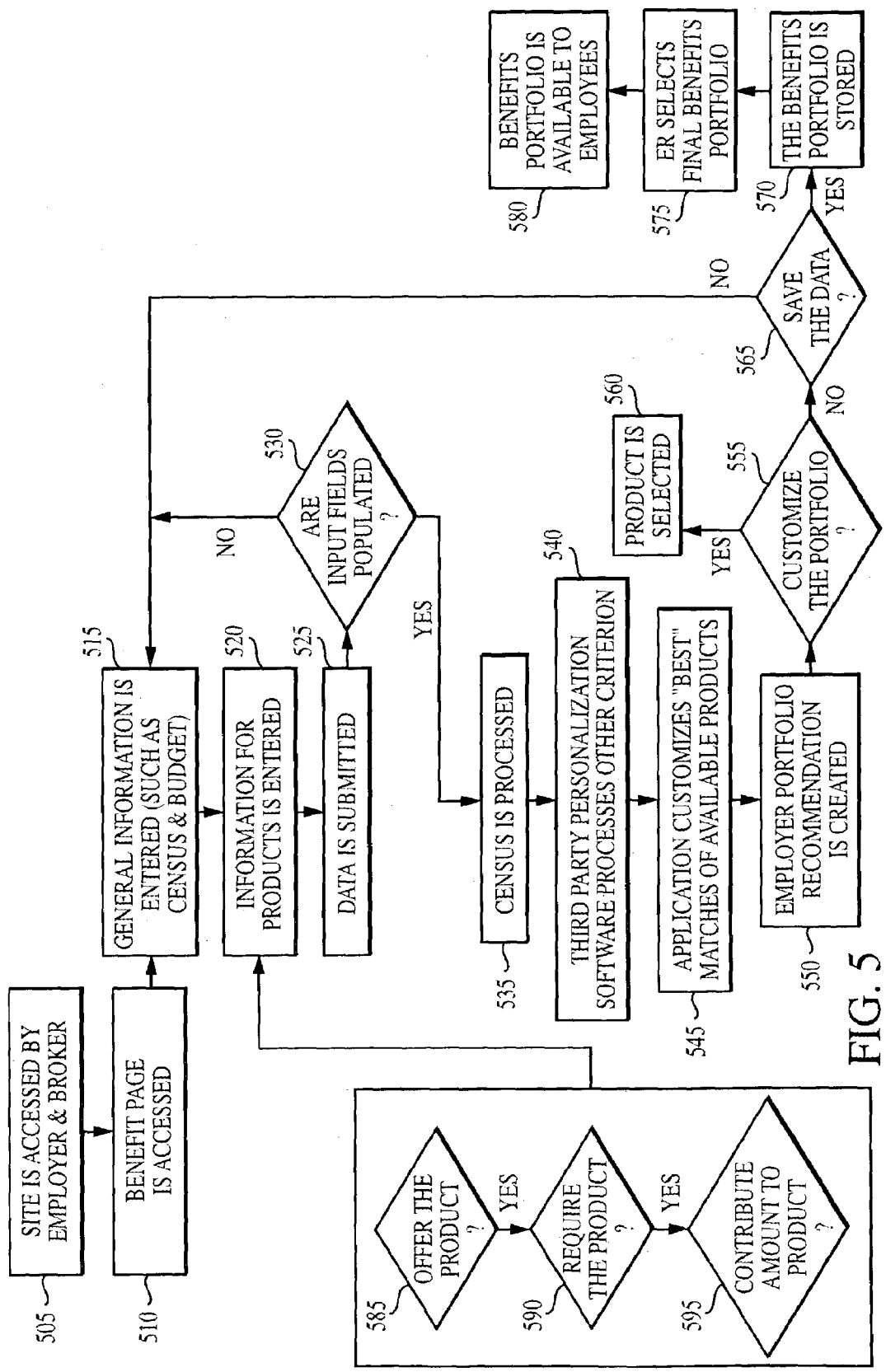
FIG. 5 is a flowchart showing how an employer may interact with the present invention.

FIG. 5 is a flowchart of an employer using one embodiment of the benefits tool to generate its benefits portfolio. At steps 505 and 510, the employer can access the benefits tool system, often via the Internet. Because a broker may access the system on the employers' behalf, most steps attributed in this document to an employer can also be completed by a broker on the employer's behalf. To begin the process of building a benefits portfolio, the employer (or broker) can enter an employer profile into the system (step 515), which usually includes general information. For example, the profile may include the budgeted amount for benefit compensation and the projected employee growth.

Then, at step 520, details about each product type can be entered, such as whether the product type is required, and whether the employer wholly, partially, or funds at all such a benefit type. This information can be used to create employer criteria, which at least in one embodiment is expressed as rules in a decision support engine. Step 520 allows the employer to offer various product types for their employees, or to choose that if the employee wants the service, then the cost will come from the employee's personal funds and not the benefit amount set aside and contributed by the employer.

Once the data is submitted successfully (steps 525 and 530), the benefits tool can process the employer's census data (step 535) in order to recommend a combination of product plans in alignment with the employer's goals.

Based on the information entered by the employer, and the census data, the benefits tool's configuration engine may produce a plan recommendation, which is made up of product plans that best meet the employer's criteria (steps 540 through 550). The configuration engine 225 may use a rules engine 230 and/or a decision support engine 235 to produce the portfolio recommendation 550. The third party software products previously mentioned can be configured for use as the rules engine and decision support engine. Alternatively, custom modules could be used. Regardless, in one embodiment, the benefits tool may return all of the suppliers' products that match the employer's criterion. This list may be semi-customized (steps 555 through 565), such as by limiting the list to the three most cost-effective, or best-fit, product plans for each product. Through further analysis, the employer may choose its defined contribution benefits portfolio, which is made up of the exact product plans that will be made available to its employees (steps 575).

As with the supplier, the employer's use of the benefits tool does not end by its initial choice of a benefits portfolio. For example, at renewal time in one embodiment of the invention, the employer may perform a compensation review of its employees. Value added insight (such as member experience, member feedback and product performance) assists the employer in budgeting and assessing or refining its goals for future benefits. Based on this, criteria within the benefits tool can be adjusted—such as which products to offer, which are mandatory, etc. This can help the employer to improve its benefits portfolio and thereby to increase employee satisfaction. In addition, the employer can set a default benefits package for employees. If the employee fails to invoke a benefits package during enrollment, then the default benefits package provides the employee at least minimal coverage.

3. The Workflow for Employees

Figure 6:
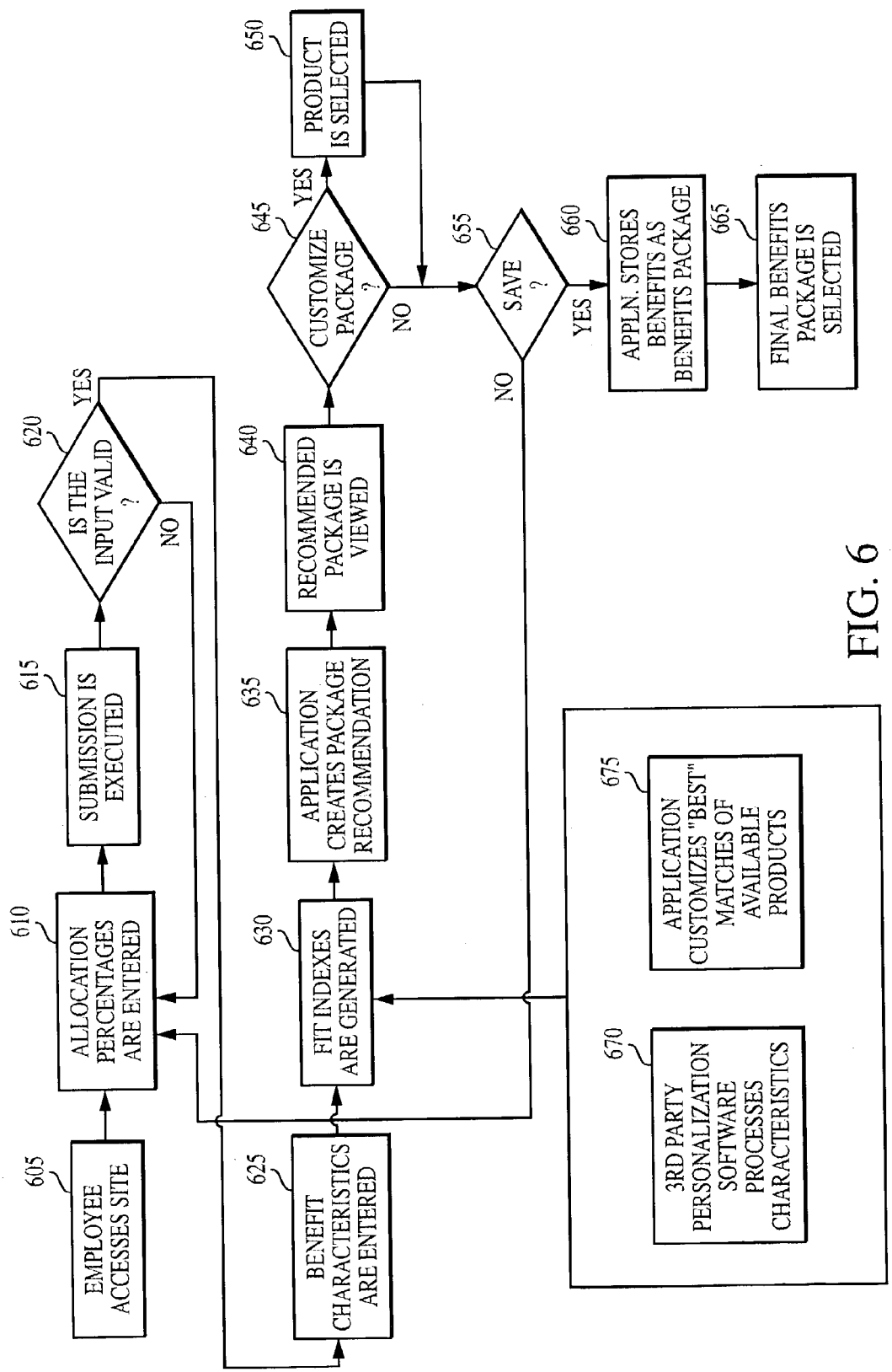
FIG. 6 is a flowchart showing how an employee may interact with the present invention.
Figure 8:
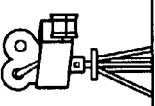

The employee can use the benefits tool to create his or her personalized benefits package when he or she is first hired, when he or she experiences a major life event (such as a birth or marriage), during the annual open enrollment period, etc. FIG. 6 is a flow chart showing how one embodiment of the benefits tool system works to assist the employee with benefits selection. The employee can access the system, often over the Internet (step 605). The employee may enter information regarding each benefit category (steps 610 through 620). For example, the employee may need to enter the preferred allocation percentage for health insurance, dental, and other benefit types. Then the employee can enter benefit characteristics via an employee profile (step 625). These characteristics may include the name of the employee's preferred physician or whether the employee wears eyeglasses. This information can serve to assist the benefits tool in choosing the best product plans for that employee. At step 630, fit indexes may be generated by personalization software (step 670) and may result in a package recommendation, which is a group of product plans for various product types that are best suited for the employee's needs (step 635). The employee can then view details for the product plans (step 640) and create his or her customized benefits package by choosing a product plan for one or more of the various product types (steps 645 through 665).

4. The Workflow for Administration

Administration duties and costs can be reduced dramatically with the benefits tool. Census uploads and member enrollment can be performed via a payroll system interface. Service outputs may include consolidated billing, payment, and reporting. The benefits tool may enable life event changes to be triggered at human resources' control without substantial work from the HR staff. It also may allow terminations to be controlled from a central source and the termination information to be distributed to the various suppliers.

Through the benefits tool, the employee may view his or her current benefits package at any time through any computer with proper access (i.e., the Internet, an intranet, etc.). For example, the employee can use the benefits tool system to find details about plan coverage for her health insurance or to verify the deductible for her dental insurance plan. This self-service approach can relieve Human Resource administration from answering many questions about coverage.

C. Walkthrough of a Preferred Embodiment of the Benefits Tool

Now that the workflows of the tool have been generally discussed, the use of the benefits tool as part of these workflows will be shown. While the overall benefits tool system offers a novel approach to such benefit systems, two aspects of certain embodiments of the benefits tool deserve special attention: (1) the rules engine and (2) the decision support engine. These components are (in at least one embodiment) located within the configuration module and are used: (1) to propose a recommendation to an employer on what mixture of products to offer in order to best meet the employer's desires; and (2) to propose a recommendation to the employee on what combination of products that are being offered by his or her employer best meet the employee's desires. While both the employer and the employee can decide to accept the recommendations entirely or can alter the recommendation by adding other products, the recommendations generated by the configuration module offer a personalized approach to defined contribution benefits.

FIGS. 7 through 17 show some of the primary web pages for one preferred embodiment of the defined contribution benefits tool system. Of course other embodiments, can present the benefits tool in differing ways. In one embodiment, FIG. 7 is the web page through which all four types of the benefits tool's users begin, namely: (1) employees having personalized benefits packages, (2) employers having selected benefits portfolios, (3) brokers who are liaisons for employers, and (4) suppliers who provide the product offerings that make up a benefits package. Upon selecting the type of user, the web page illustrated by FIG. 8 requires the entry of a user name and password for security purposes.

FIGS. 9 through 12 illustrate web pages for an employer user. Along the left side of the web page is a navigation panel 905, allowing the user to jump to pages relating to the employer's account, profile, and portfolio, as well as a page to view available products offered by suppliers.

The navigation panel provides a view of the employer via access to a reports page, a page to review employees, and a summary page. For profile information, the navigation panel gives access to edit and/or view the profile. For portfolio information, the employer may use the navigation panel to create a new portfolio, modify a current portfolio, or to edit a scenario.

Along the top of the web page is a reference resource 910 that allows the user to jump to the home page, use a glossary, read FAQs, contact the benefits tool administrators, or to view a site map of the entire system.

The main frame 915 of the web page from FIG. 9 shows that the user who has logged onto the benefits tool system represents the employer Dynamic Graphics. The remainder of the frame 915 details the benefits portfolio currently created for Dynamic Graphics. Each category of benefit is listed, namely: health insurance, health FSA, dental insurance, retirement plan, life insurance, auto insurance, and concierge service. For each category of benefit Dynamic Graphics has chosen to make available to its employers, the suppliers and products are listed. For example, out of the many suppliers of health insurance from the benefits tool system, Dynamic Graphics has chosen just two suppliers—AllyMyCare and GoodRemedy. From each of these suppliers, two products have been chosen so that the employees have a total of four health insurance products from which to choose. On the other hand, the employer only offers one product from a single supplier for auto insurance.

On the web page of FIG. 9, the employer is shown the annual employer costs and the annual employee costs. In addition, the employer has access to supplier-relevant information, including information on the suppliers' products, which can be accessed via hyperlinks.

Figure 10:
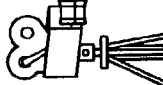

FIG. 10 is the web page used by Dynamic Graphics to view or edit its profile. The profile includes information used throughout the system to assist in the creation of the benefits portfolio, as well as information that is converted into business rules as constraints on how an employee can create his or her personalized benefits package. These rules are stored in the rules engine of the configuration module. In this case, Dynamic Graphics has 1.5 million dollars budgeted for compensation and a 10 percent expected growth rate in employees. Dynamic Graphics indicates that it wants to offer each type of benefit shown—from health insurance through concierge service. Of these, its employees are only required to select health insurance. All other types of benefits are optional. Health, dental, LTD, retirement, and life insurance may be partially funded by contributions made by Dynamic Graphics. Such range options allow products to be paid by employer-provided funds. Other products, such as concierge services, can be set up so that the funding is exclusively from the employee's personal funds.

Further constraints set up require an employee to use at least 25 percent, but not more than 80 percent, of its defined contribution dollars for health insurance. For the optional retirement benefit, if the employee chooses to purchase the benefit, the employee can use up to a value that is 7% of his or her salary from their employer provided contribution account or no more than three thousand dollars of this account for the matching benefit.

Figure 11:
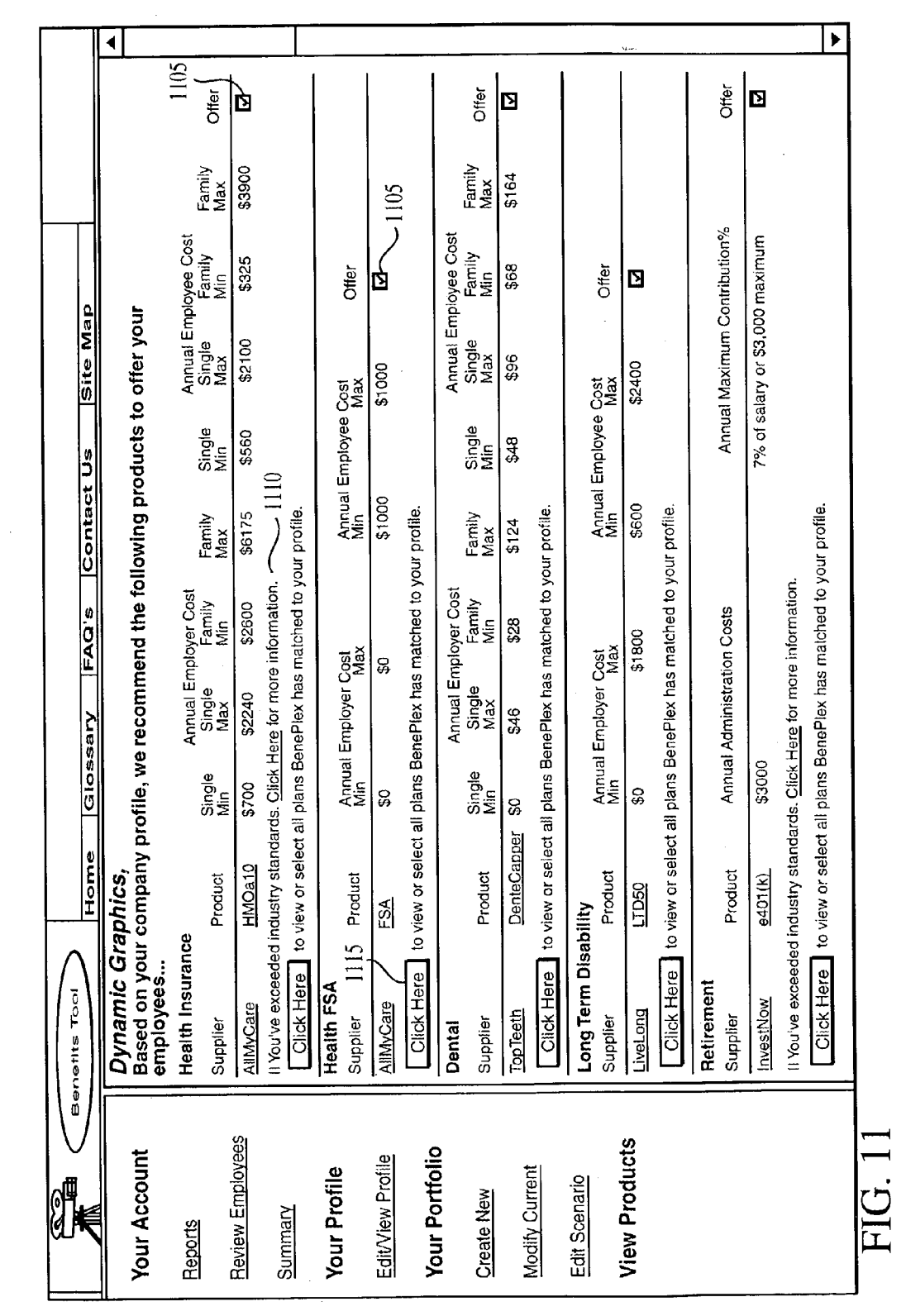
Figure 12:
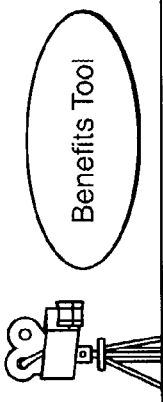

The employer's profile may also includes other information, such as the pay cycle, the state of employment, number of employees, type of industry, and whether a family subsidy is provided. Based on all of the information entered in the profile, the benefits tool system generates a listing of the products offered by the various suppliers, where the products best match, or optimize, the profile information. This portfolio recommendation is made by the decision support engine and is based on the product information from the suppliers and the rules engine's knowledge of the employer's criteria. This optimized listing is shown in FIGS. 11 and 12. Sometimes, the optimized listing will indicate that alternative products are nearly equally preferred (e.g., the concierge category 1205).

From the web page shown in FIGS. 11 and 12, the employer can select the products that will be offered it its employees as a benefits portfolio by selecting the "Offer" checkboxes 1105. The employer may also add other products that sub-optimally meet the profile requirements 1115. In this way, the employer's benefits portfolio includes a number of products for each type of benefit from which its employees can choose. The benefits tool system may also inform the employer when industry standards, federal or state regulated limits, or other aberrations exist from the criteria set up in the profile. These standards and regulations can also be stored in the rules engine. For example, in FIG. 11, the benefits tool warns that the health insurance criteria exceeds industry standards 1110.

FIGS. 13 through 17 relate to web pages for an employee who is using the benefits tool system. As with the employer section discussed above, the employee-directed web pages include a navigation panel 1305. From this panel, the employee (Rebecca in this example) may access her profile, current coverage, coverage scenarios and information on various benefit categories (such as health insurance and dental insurance). She may also learn how to choose a personalized benefits package and work with an online tutorial. As with the employer web pages, along the top of the web page is a system panel 910 that allows the user to jump to the home page, use a glossary, read FAQs, contact the benefits tool administrators, or view a site map of the entire system.

Figure 13:
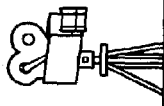

FIG. 13 illustrates how the system presents to Rebecca her current personalized benefits package. This plan has a chosen product for each category type. For example, Rebecca has chosen the PPOb30 product 1310 offered by AllMyCare as her health insurance plan. While this product costs $1105 annually, Rebecca only contributes $17 a pay period, for a total contribution of $442 annually. Rebecca is reminded by this screen that open enrollment for her benefits is from November third through December eighth. The bottom of the web page shows that for this defined contribution plan, Rebecca's employer contributes $5,000 annually 1315 and Rebecca contributes $3864 annually 1320.

Figure 14:
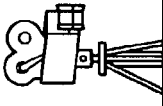
Figure 15:
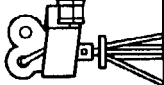

FIG. 14 is the web page that Rebecca, the employee, uses to maintain her personal information for her profile. Here, her home address 1405, phone number 1410, marital status 1415 and other data are available. FIG. 15 shows the rest of Rebecca's profile data. At the top of the page, Rebecca is informed that $11,194/year is defined as the contribution per year from her employer 1505 for the next benefits year. She is able to create a recommendation for a personalized benefits package by allocating this contribution amount in any way she wants—subject to certain limitations. A series of fields 1510 allows Rebecca to allocate a percentage of the $11,194 amount for the various benefit categories. The limitations are created from those limitations input by her employer. For example, health insurance is a required product 1515, and she must allocate at least 25% of the contribution amount, but not more than 80%, to health insurance 1520. The benefits tool system ensures that Rebecca's allocations add up to 100% (1525).

Figure 16:
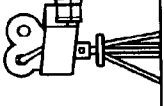

Once Rebecca, the employee, has entered her allocation percentages, additional questions may be presented to her (see FIG. 16). The answers to such questions as "Do you wear contact lenses" 1605 and "How many times a month do you exercise" 1610, can be used by the benefits tool's configuration module in choosing a best-fit benefits package for Rebecca. Once all of the questions have been answered, the employee can press a button 1615 for a package recommendation.

Figure 17:
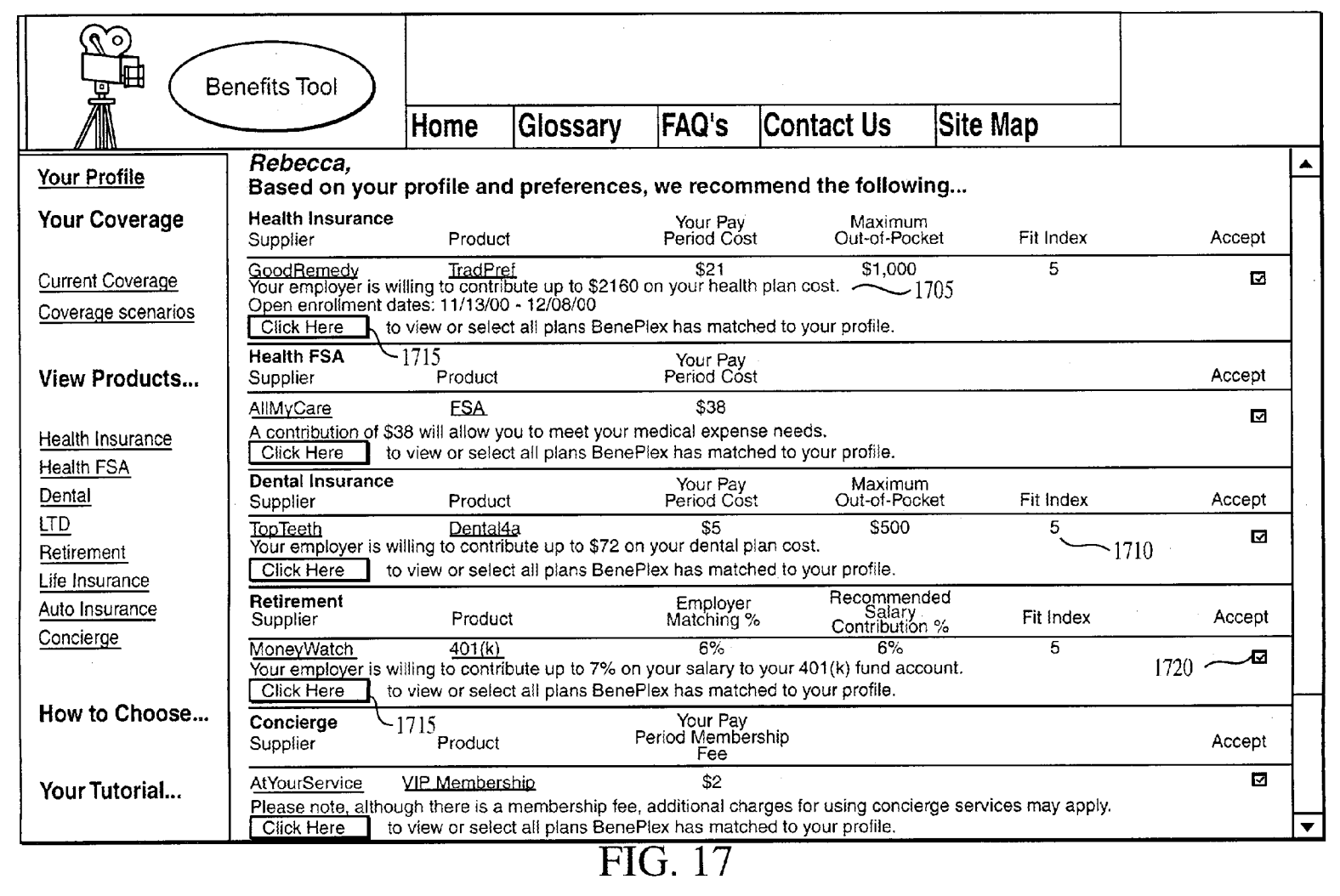

FIG. 17 is the result of pressing that button 1615. Here, the benefits tool's configuration tool has used the business rules constraints entered by the suppliers, her employer, Rebecca's desired percentage allocations, and answers to the various questions, to create an optimized (or best-fit) benefits package recommendation for Rebecca out of the products that her employee has selected for its benefits portfolio. Detailed information can be displayed for some of the products, such as the amount of the employee contribution and the open enrollment dates 1705. A Fit Index is a rating that shows how near each product is to matching Rebecca's wishes for her benefits package. Rebecca does not need to accept all of the products recommended by the benefits tool system but can instead incorporate other similar products by pressing the appropriate buttons 1715. Selecting the "Accept" checkboxes 1720 indicates which products are to be purchased to form her personalized benefits package.

D. Additional Embodiments of the Benefits Tool System

There are other functions available in some embodiments of the invention. In one embodiment, member functions may include the ability to research care, such as researching a condition, searching for providers, and estimating a treatment budget. Other embodiments can expand the benefits tool so it becomes a greater part of the employee's life. For example, the web site can include pages with titles such as: my out-of-pockets, my section 125, my pharmacy, my health goals, my health diary, and my related links.

The benefits tool can also offers employees information on the doctors available within the various supplier networks. Through the benefits tool, an employee can have access to web pages titled such as: my co-payment, view peer group, browse consumer research, calculate impact, submit claim to supplier, my contract, my provider manual, check email, search for consultants, message board, associations, publications, research archive, and view feedback.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims.

What is claimed is:

1. A method for managing defined contribution benefits, comprising:
    storing product information about a plurality of benefits products from a plurality of benefits suppliers in a computer system for access by multiple of a plurality of employers and by multiple of a plurality of employees, wherein each of the plurality of employees corresponds to one of the plurality of employers;
    designing a plurality of defined contribution benefits portfolios, each of the defined contribution benefits portfolios corresponding to one of the plurality of employers, including for each employer:
        providing an employer profile, the profile including the budgeted amount for benefit compensation provided by the employer;
        defining a plurality of categories of benefits within the defined contribution benefits portfolio, including defining employer preferred allocation values towards the benefits categories;
        automatically generating, with a computer, a portfolio recommendation for the employer, comprising a set of recommended benefit product plans selected from a combination of the plurality of benefit products customized to both of the employer profile and the preferred allocation values towards the benefits categories; and
        selecting a set of benefit product plans to be offered within the defined contribution benefit portfolio based upon the portfolio recommendation and selections of the plurality of benefit products by the employer;
    establishing a defined benefit selection from the defined contribution benefit portfolio of the employer corresponding to each employee, including for each employee:
        presenting, to the employee, a total contribution by the employer towards benefits;
        presenting, to the employee, the benefit categories and benefit products within the benefit product plans contained within the defined contribution benefits portfolio of the employer;
        receiving, from the employee, a plurality of preferred allocation values indicating employee preferences of how to apportion the total employer contribution among the benefit categories and benefit products;
        generating a package recommendation for the employee, comprising a combination of benefit products from the set of benefit product plans that is customized according to the preferred allocation values; and
        presenting options to enable the employee to select a personalized subset of benefit products from the plurality of benefits products based on the package recommendation; and
    configuring, for each of the plurality of employees, a benefits package, the benefits package containing the personalized subset of the benefits products selected from the defined contribution benefits portfolio designed for the employer of the employee.

2. The method for managing defined contribution benefits from claim 1, wherein designing each of the plurality of defined contribution benefits portfolios further comprises:
    creating the employer profile, the employer profile indicating parameters of the defined contribution benefits portfolio; and
    creating selections of the plurality of benefits products to be offered within the benefit product plans according to the parameters of the defined contribution benefits portfolio.

3. The method for managing defined contribution benefits from claim 1, wherein the plurality of benefit categories correspond to the plurality of benefits products; and
    wherein the employer profile comprises a set of offered categories chosen from the plurality of benefit categories.

4. The method for managing defined contribution benefits from claim 3, wherein the employer profile comprises a set of required categories chosen from the set of offered categories.

5. The method for managing defined contribution benefits from claim 3, wherein the employer profile comprises a set of contribution categories for each of the offered categories.

6. The method for managing defined contribution benefits from claim 3, wherein the employer profile comprises a set of contribution ranges for each of the offered categories.

7. The method for managing defined contribution benefits from claim 6, wherein the set of contribution ranges for each of the offered categories comprises a minimum value.

8. The method for managing defined contribution benefits from claim 6, wherein the set of contribution ranges for each of the offered categories comprises a maximum value.

9. The method for managing defined contribution benefits from claim 6, wherein the set of contribution ranges for each of the offered categories comprises a cap value.

10. The method for managing defined contribution benefits from claim 1, wherein the preferred allocation values are consistent with a set of required categories, and a set of contribution ranges from an employer profile.

11. A method for designing an employer benefits portfolio in a system for managing defined contribution benefits, wherein a plurality of benefit categories correspond to a plurality of benefits products, the method comprising:
- creating an employer profile for each of a plurality of employers indicating parameters of a defined contribution benefits portfolio, the profile including the budgeted amount for benefit compensation provided by the employer;
- defining the plurality of benefit categories within the defined contribution benefits portfolio, including defining employer preferred allocation values towards the benefits categories;
- automatically generating, with a computer, a portfolio recommendation, comprising a combination of benefits products customized to both of the employer profile and the preferred allocation values towards the plurality of benefits categories; and
- choosing a set of offered benefits products from the plurality of benefits products based on the portfolio recommendation and selections of the plurality of benefit products by the employer.

12. The method for managing defined contribution benefits from claim 11, wherein the employer profile comprises a set of offered categories chosen from the plurality of benefit categories.

13. The method for managing defined contribution benefits from claim 12, wherein the employer profile comprises a set of required categories chosen from the set of offered categories.

14. The method for managing defined contribution benefits from claim 12, wherein the employer profile comprises a set of contribution categories for each of the offered categories.

15. The method for managing defined contribution benefits from claim 12, wherein the employer profile comprises a set of contribution ranges for each of the offered categories.

16. The method for managing defined contribution benefits from claim 15, wherein the set of contribution ranges for each of the offered categories comprises a minimum value.

17. The method for managing defined contribution benefits from claim 15, wherein the set of contribution ranges for each of the offered categories comprises a maximum value.

18. The method for managing defined contribution benefits from claim 15, wherein the set of contribution ranges for each of the offered categories comprises a cap value.

19. A system for managing defined contribution benefits, comprising:
- a storage unit for storing benefits product information about a plurality of benefits products from a plurality of benefits suppliers in a computer system for access by multiple of a plurality of employers and by multiple of a plurality of employees, wherein each of the plurality of employees corresponds to one of the plurality of employers;
- a designer unit for designing a plurality of defined contribution benefits portfolios, each of the defined contribution benefits portfolios corresponding to one of the plurality of employers, including for each employer:
  - providing an employer profile, the profile including the budgeted amount for benefit compensation provided by the employer;
  - defining a plurality of categories of benefits within the defined contribution benefits portfolio, including defining employer preferred allocation values towards the benefits categories;
  - generating a portfolio recommendation for the employer, comprising a set of recommended benefit product plans selected from a combination of the plurality of benefit products customized to both of the employer profile and the preferred allocation values towards the benefits categories; and
  - selecting a set of benefit product plans to be offered within the defined contribution benefit portfolio based upon the portfolio recommendation and selections of the plurality of benefit products by the employer;
- a selection unit for establishing a defined benefit selection from the defined contribution benefit portfolio of the employer corresponding to each employee, including for each employee:
  - presenting, to the employee, a total contribution by the employer towards benefits;
  - presenting, to the employee, the benefit categories and benefit products within the benefit product plans contained within the defined contribution benefits portfolio of the employer;
  - receiving, from the employee, a plurality of preferred allocation values indicating employee preferences of how to apportion the total employer contribution among the benefit categories and benefit products;
  - generating a package recommendation for the employee, comprising a combination of benefit products from the set of benefit product plans that is customized according the preferred allocation values; and
  - presenting options to enable the employee to select a personalized subset of benefit products from the plurality of benefits products based on the package recommendation; and
- a configuration unit for configuring, for each of the plurality of employees, a benefits package, the benefits package containing a personalized subset of the benefits products selected from the defined contribution benefits portfolio designed for the employer of the employee.

20. The system for managing defined contribution benefits from claim 19, wherein the designer unit further comprises:
- a profile creation unit for creating the employer profile, the employer profile indicating parameters of the defined contribution benefits portfolio; and
- a product choosing unit for creating selections of the plurality of benefits products to be offered within the benefit product plans according to the parameters of the defined contribution benefits portfolio.

21. The system for managing defined contribution benefits from claim 19, wherein the plurality of benefit categories correspond to the plurality of benefits products; and
wherein the employer profile comprises a set of offered categories chosen from the plurality of benefit categories.

22. The system for managing defined contribution benefits from claim 21, wherein the employer profile comprises a set of required categories chosen from the set of offered categories.

23. The system for managing defined contribution benefits from claim 21, wherein the employer profile comprises a set of contribution categories for each of the offered categories.

24. The system for managing defined contribution benefits from claim 21, wherein the employer profile comprises a set of contribution ranges for each of the offered categories.

25. The system for managing defined contribution benefits from claim 24, wherein the set of contribution ranges for each of the offered categories comprises a minimum value.

26. The system for managing defined contribution benefits from claim 24, wherein the set of contribution ranges for each of the offered categories comprises a maximum value.

27. The system for managing defined contribution benefits from claim 24, wherein the set of contribution ranges for each of the offered categories comprises a cap value.

28. The system for managing defined contribution benefits from claim 19, wherein the preferred allocation values are consistent with a set of required categories, and a set of contribution ranges for an employer profile.

29. A system for designing an employer benefits portfolio in a system for managing defined contribution benefits, wherein a plurality of benefit categories correspond to a plurality of benefits products, the system comprising:
- an employer profile creation unit for creating an employer profile for each of a plurality of employers indicating parameters of a defined contribution benefits portfolio, the profile including the budgeted amount for benefit compensation provided by the employer;
- an employer benefit categorization unit for defining the plurality of benefit categories within the defined contribution benefits portfolio, including defining employer preferred allocation values towards the benefits categories;
- a portfolio recommendation generation unit for generating a portfolio recommendation, comprising a combination of benefits products customized to both of the employer profile and the preferred allocation values towards the plurality of benefits categories; and
- an offered benefits products unit for choosing a set of offered benefits products from the plurality of benefits products based on the portfolio recommendation and selections of the plurality of benefit products by the employer.

30. The system for managing defined contribution benefits from claim 29, wherein the employer profile comprises a set of offered categories chosen from the plurality of benefit categories.

31. The system for managing defined contribution benefits from claim 29, wherein the employer profile comprises a set of required categories chosen from the set of offered categories.

32. The system for managing defined contribution benefits from claim 29, wherein the employer profile comprises a set of contribution categories for each of the offered categories.

33. The system for managing defined contribution benefits from claim 29, wherein the employer profile comprises a set of contribution ranges for each of the offered categories.

34. The system for managing defined contribution benefits from claim 33, wherein the set of contribution ranges for each of the offered categories comprises a minimum value.

35. The system for managing defined contribution benefits from claim 33, wherein the set of contribution ranges for each of the offered categories comprises a maximum value.

36. The system for managing defined contribution benefits from claim 33, wherein the set of contribution ranges for each of the offered categories comprises a cap value.

37. A computer program on a computer readable medium, for managing defined contribution benefits when executed by a computer, the computer program comprising:
- a code segment that stores product information about a plurality of benefits products from a plurality of benefits suppliers in a computer system for access by multiple of a plurality of employers and by multiple of a plurality of employees, wherein each of the plurality of employees corresponds to one of the plurality of employers;
- a code segment that designs a plurality of defined contribution benefits portfolios, each of the defined contribution benefits portfolios corresponding to one of the plurality of employers, including for each employer:
  - providing an employer profile, the profile including the budgeted amount for benefit compensation provided by the employer;
  - defining a plurality of categories of benefits within the defined contribution benefits portfolio, including defining employer preferred allocation values towards the benefits categories;
  - generating a portfolio recommendation for the employer, comprising a set of recommended benefit product plans selected from a combination of the plurality of benefit products customized to both of the employer profile and the preferred allocation values towards the benefits categories; and
  - selecting a set of benefit product plans to be offered within the defined contribution benefit portfolio based upon the portfolio recommendation and selections of the plurality of benefit products by the employer;
- a code segment that establishes a defined benefit selection from the defined contribution benefit portfolio of the employer corresponding to each employee, including for each employee:
  - presenting, to the employee, a total contribution by the employer towards benefits;
  - presenting, to the employee, the benefit categories and benefit products within the benefit product plans contained within the defined contribution benefits portfolio of the employer;
  - receiving, from the employee, a plurality of preferred allocation values indicating employee preferences of how to apportion the total employer contribution among the benefit categories and benefit products;
  - generating a package recommendation for the employee, comprising a combination of benefit products from the set of benefit product plans that is customized according the preferred allocation values; and
  - presenting options to enable the employee to select a personalized subset of benefit products from the plurality of benefits products based on the package recommendation; and
- a code segment that configures, for each of the plurality of employees, a benefits package, the benefits package containing a personalized subset of the benefits products selected from the defined contribution benefits portfolio designed for the employer of the employee.

38. The computer program for managing defined contribution benefits from claim 37, wherein the code segment that designs each of the plurality of defined contribution benefits portfolios comprises:
- a code segment that creates the employer profile, the employer profile indicating parameters of the defined contribution benefits portfolio; and
- a code segment that creates selections of the plurality of benefits products to be offered within the benefit product plans according to the parameters of the defined contribution benefits portfolio.

39. The computer program for managing defined contribution benefits from claim 37, wherein the plurality of benefit categories correspond to the plurality of benefits products, and
   wherein the employer profile comprises a set of offered categories chosen from the plurality of benefit categories.

40. The computer program for managing defined contribution benefits from claim 39, wherein the employer profile comprises a set of required categories chosen from the set of offered categories.

41. The computer program for managing defined contribution benefits from claim 39, wherein the employer profile comprises a set of contribution categories for each of the offered categories.

42. The computer program for managing defined contribution benefits from claim 39, wherein the employer profile comprises a set of contribution ranges for each of the offered categories.

43. The computer program for managing defined contribution benefits from claim 42, wherein the set of contribution ranges for each of the offered categories comprises a minimum value.

44. The computer program for managing defined contribution benefits from claim 42, wherein the set of contribution ranges for each of the offered categories comprises a maximum value.

45. The computer program for managing defined contribution benefits from claim 42, wherein the set of contribution ranges for each of the offered categories comprises a cap value.

46. The computer program for managing defined contribution benefits from claim 37, wherein the preferred allocation values are consistent with the set of required categories, and the set of contribution ranges from an employer profile.

47. A computer program on a computer readable medium, for designing an employer benefits portfolio when executed by a computer, wherein a plurality of benefit categories correspond to a plurality of benefits products, the computer program comprising:
   a code segment that creates an employer profile for each of a plurality of employers indicating parameters of a defined contribution benefits portfolio, the profile including the budgeted amount for benefit compensation provided by the employer;
   a code segment that defines the plurality of benefit categories within the defined contribution benefits portfolio, including defining employer preferred allocation values towards the benefits categories;
   a code segment that generates a portfolio recommendation, comprising a combination of benefits products customized to both of the employer profile and the preferred allocation values towards the plurality of benefits categories; and
   a code segment that chooses a set of offered benefits products from the plurality of benefits products based on the portfolio recommendation and selections of the plurality of benefit products by the employer.

48. The computer program for managing defined contribution benefits from claim 47, wherein the employer profile comprises a set of offered categories chosen from the plurality of benefit categories.

49. The computer program for managing defined contribution benefits from claim 47, wherein the employer profile comprises a set of required categories chosen from the set of offered categories.

50. The computer program for managing defined contribution benefits from claim 47, wherein the employer profile comprises a set of contribution categories for each of the offered categories.

51. The computer program for managing defined contribution benefits from claim 47, wherein the employer profile comprises a set of contribution ranges for each of the offered categories.

52. The computer program for managing defined contribution benefits from claim 51, wherein the set of contribution ranges for each of the offered categories comprises a minimum value.

53. The computer program for managing defined contribution benefits from claim 51, wherein the set of contribution ranges for each of the offered categories comprises a maximum value.

54. The computer program for managing defined contribution benefits from claim 51, wherein the set of contribution ranges for each of the offered categories comprises a cap value.

55. The method from claim 2, further comprising adding to the set of offered products at least one benefits product not included in the portfolio recommendation.

56. The system from claim 29, wherein the code segment that chooses the set of offered products adds to the set at least one product not included in the portfolio recommendation.

57. The computer program from claim 38, further comprising adding to the set of offered products at least one product not included in the portfolio recommendation.

58. The method for managing defined contribution benefits from claim 1, wherein each of the benefits suppliers participate in a workflow, including enrolling employers and employees with benefits products, performing underwriting analysis to evaluate performance of benefits products, adjusting benefits products based upon the underwriting analysis, and renewing availability of benefits products to employers and employees.

59. The system for managing defined contribution benefits from claim 19, wherein each of the benefits suppliers participate in a workflow, including enrolling employers and employees with benefits products, performing underwriting analysis to evaluate performance of benefits products, adjusting benefits products based upon the underwriting analysis, and renewing availability of benefits products to employers and employees.

60. The computer program for managing defined contribution benefits from claim 37, further comprising a code segment which allows each of the benefits suppliers to participate in a workflow, including enrolling employers and employees with benefits products, performing underwriting analysis to evaluate performance of benefits products, adjusting benefits products based upon the underwriting analysis, and renewing availability of benefits products to employers and employees.

* * * * *

UNITED STATES PATENT AND TRADEMARK OFFICE
CERTIFICATE OF CORRECTION

| | | |
|---|---|---|
| PATENT NO. | : 7,584,107 B2 | Page 1 of 1 |
| APPLICATION NO. | : 10/237889 | |
| DATED | : September 1, 2009 | |
| INVENTOR(S) | : Lawrence B. Leisure et al. | |

It is certified that error appears in the above-identified patent and that said Letters Patent is hereby corrected as shown below:

Claim 19, col. 14, line 45, "desigued" should read -- designed --.

Signed and Sealed this

Thirteenth Day of October, 2009

David J. Kappos
*Director of the United States Patent and Trademark Office*